US011911988B2

(12) United States Patent
Meyer

(10) Patent No.: US 11,911,988 B2
(45) Date of Patent: Feb. 27, 2024

(54) MANUALLY OPERATED PRESS

(71) Applicant: Gebr. Schmidt Fabrik für Feinmechanik Gmbh & Co. KG, St. Georgen (DE)

(72) Inventor: Andreas Leo Meyer, Furtwangen (DE)

(73) Assignee: GEBR. SCHMIDT FABRIK FÜR FEINMECHANIK GMBH & CO. K, St. Georgen (DE)

( * ) Notice: Subject to any disclaimer, the term of this patent is extended or adjusted under 35 U.S.C. 154(b) by 401 days.

(21) Appl. No.: 17/217,095

(22) Filed: Mar. 30, 2021

(65) Prior Publication Data

US 2021/0213698 A1 Jul. 15, 2021

Related U.S. Application Data

(63) Continuation of application No. PCT/EP2019/076050, filed on Sep. 26, 2019.

(30) Foreign Application Priority Data

Oct. 5, 2018 (DE) ..................... 10 2018 124 596.3

(51) Int. Cl.
*B30B 1/24* (2006.01)
*B30B 15/00* (2006.01)

(52) U.S. Cl.
CPC ............ *B30B 1/24* (2013.01); *B30B 15/0064* (2013.01)

(58) Field of Classification Search
CPC .... B30B 1/02; B30B 1/04; B30B 1/24; B30B 9/28; B30B 15/005; B30B 15/0064
See application file for complete search history.

(56) References Cited

U.S. PATENT DOCUMENTS 2,006,746 A 7/1935 Poole
3,157,112 A * 11/1964 Truhon ..................... B30B 1/24 100/231
3,251,250 A 5/1966 Mitchell
(Continued)

FOREIGN PATENT DOCUMENTS

CN 2429321 Y 5/2001
CN 202945865 U 5/2013
(Continued)

OTHER PUBLICATIONS

Office Action issued by the China National Intellectual Property Administration (CNIPA) for application 201980065909.6 dated Jan. 19, 2023.

(Continued)

*Primary Examiner* — Matthew Katcoff
(74) *Attorney, Agent, or Firm* — REISING ETHINGTON P.C.

(57) ABSTRACT

A manually operated press comprising an actuating member coupled to a shaft, wherein an actuation of the actuating member is converted into a stroke movement of a press ram coupled to the shaft, and hence also into a change in a relative position of the press ram. The press furthermore comprises a reset mechanism for resetting the actuating member, which reset mechanism counteracts the actuation of the actuating member and causes a return movement of the press ram opposite the stroke movement. The reset mechanism comprises a spiral spring.

17 Claims, 5 Drawing Sheets

(56) References Cited

U.S. PATENT DOCUMENTS

| | | | | |
|---|---|---|---|---|
| 4,317,176 A * | 2/1982 | Saar | G05B 19/4163 318/434 |
| 5,902,077 A * | 5/1999 | Halder | B23Q 1/5481 408/100 |
| 7,562,622 B2 | 7/2009 | Babiel et al. | |
| 2004/0179910 A1* | 9/2004 | Theising | B23Q 5/54 408/135 |

FOREIGN PATENT DOCUMENTS

| | | |
|---|---|---|
| CN | 203514981 U | 4/2014 |
| CN | 203835594 U | 9/2014 |
| CN | 205129003 U | 4/2016 |
| DE | 2504872 A1 | 8/1976 |
| DE | 4022548 A1 | 2/1991 |
| DE | 102005034424 A1 | 1/2007 |
| DE | 102014114299 A1 | 4/2016 |
| DE | 202018101354 U1 | 3/2018 |
| GB | 03779 | 4/1914 |
| JP | S62155990 U | 10/1987 |
| JP | H04367396 A | 12/1992 |

OTHER PUBLICATIONS

English Translation of the Office Action issued by the China National Intellectual Property Administration (CNIPA) for application 201980065909.6 dated Jan. 19, 2023.
1 International Search Report and Written Opinion issued for PCT/EP2019/076050 dated Jan. 20, 2020; 13 pages.
International Preliminary Report on Patentability issued for PCT/EP2019/076050 dated Mar. 23, 2021; 6 pages.
Examination Report issued by the European Patent Office for application 19779456.3 dated Jan. 3, 2022.

* cited by examiner

MANUALLY OPERATED PRESS

CROSS REFERENCE TO RELATED APPLICATIONS

This application is a continuation of international patent application PCT/EP2019/076050, filed on Sep. 26, 2019 designating the U.S., which international patent application has been published in German language and claims priority from German patent application DE 10 2018 124 596.3, filed on Oct. 5, 2018. The entire contents of these priority applications are incorporated herein by reference.

BACKGROUND

This disclosure relates to a manually operated press.

Such manually operated presses, also known as hand lever presses, are used in great numbers for manual mounting processes. They may be configured as toggle presses or rack presses.

In toggle presses, the press ram is moved by means of a toggle mechanism driven by an actuating member that is usually configured as an actuating lever. The press ram here performs a sinuous movement. As the adjustment angle of the actuating lever (actuating member) increases, the press ram executes a smaller travel. When the toggle mechanism is in the so-called "extended position", the stroke of the press ram is fully extended. Shortly before the extended position of the toggle lever, because of the toggle mechanism, a great force can be exerted on the press ram. Manually operated presses with toggle mechanisms (toggle presses) are therefore preferably suitable for pressing processes in which a high force is required over a short travel.

In rack presses, the press ram is driven via a spur gear shaft which engages in a rack or toothing arranged on the press ram. The spur gear shaft is usually fixedly connected to the actuating member (e.g. actuating lever). The spur gear shaft may be made in one piece or multiple pieces (shaft, shaft-hub connection, spur gear). The press ram may be formed as both a round ram and a square ram. At the end of the press ram, a tool receiver is provided for receiving customer-specific pressing tools. Usually, an anti-twist device prevents twisting of the press ram over the entire stroke.

In these rack presses, the ram stroke is determined by the length of the rack attached to the ram or the length of the toothing integrated in the ram, and by the adjustment angle of the actuating lever. For the same force application on the actuating lever, theoretically the same pressing force is exerted over the entire ram stroke. Manual lever presses with racks (rack presses) are therefore preferably suitable for pressing processes in which a continuous force is required over a long travel.

Manually operated presses, irrespective of whether they are formed as toggle presses or rack presses, are usually equipped with a reset mechanism, the purpose of which is to return the press ram and hence the actuating member to the starting position after a pressing process. Within this reset mechanism, for example, a reset spring may be used which is configured as a conventional tension spring. The disadvantage here however lies in the installation conditions, since such tension springs must be designed relatively large, in particular for a large ram stroke. A further disadvantage of the use of such conventional tension springs is the force difference which exists between the starting position and the maximum ram stroke.

Alternatively, for example, a torsion spring formed as a helical spring may be used in the reset mechanism. Such torsion springs can be arranged in a rack press, for example between the spur gear shaft or spur gear and the slider housing in which the press ram is longitudinally guided. For manually operated presses with short ram stroke, the torsion spring, because of the low number of windings, may be accommodated compactly in the slider housing. By actuation of the actuating member, the torsion spring is twisted about its longitudinal axis and is torsion-loaded. As the rotation angle increases, the torque increases, and hence also the return force of the torsion spring. Therefore during the pressing process, as the rotation angle increases, the operator experiences an increase in the force which must be overcome for actuation of the actuating member. A further disadvantage of such torsion springs is the increase in length depending on rotational angle. For each revolution, the length of the torsion spring increases by the amount of the spring wire thickness.

For manually operated presses with large ram strokes, torsion springs with very many windings must be used. However, because of the installation length of the torsion spring, this high number of windings of the torsion spring prevents its installation in slider housings of typical size. Furthermore, at high rotation angles, there is a danger that the torsion spring will "buckle" under the torsion loading. This leads to premature breakage of the torsion spring and hence total failure of the reset mechanism. Torsion springs are therefore poorly suited for use in return mechanisms for manually operated presses with a large ram stroke.

SUMMARY

It is an object to provide a manually operated press which overcomes the above-mentioned disadvantages. In particular, it is an object to improve the reset mechanism for resetting the actuating member.

According to an aspect, a manually operated press is presented, comprising a shaft, an actuating member coupled to the shaft, a press ram coupled to the shaft, and a reset mechanism that is configured to reset the actuating member. An actuation of the actuating member is converted into a stroke movement of the press ram. The reset mechanism is configured to counteract the actuation of the actuating member and to cause a return movement of the press ram opposite the stroke movement, wherein the reset mechanism comprises a spiral spring.

The terms "spiral spring", "spiral" or "spiral-shaped" in the present case should not be confused with the terms "helical spring", "helical" or "screw-like". The spiral spring used here, in contrast to a helical spring or torsion spring, has a spiral form in the mathematical sense, whereas a helical spring or torsion spring typically has a helical or screw-like form. A spiral spring is configured as a spirally wound leaf spring in which the spring leaf has a decreasing distance from the axis as the rotational angle about the axis of the spiral spring increases. The usually flat spring leaf of such spiral springs, in contrast to the helically wound wire of a torsion spring, when loaded does not stand under torsion but under tension.

Such spiral springs are also denoted as motive springs.

The essential advantage of the use of a spiral spring in the present case of a reset mechanism of a manually operated press is that when loaded, such spiral springs generate a relatively constant force profile which is practically independent of their twist angle. When a spiral spring is used in a reset mechanism of a manually operated press, therefore, for the user of the press, there is only a minimum force difference between the starting position and the maximum position of the actuating member (e.g. actuating lever). For the user, this is expressed in a very pleasant and continuous actuation of the actuating member without increased or changing force application. Also, the return movement caused by the reset mechanism is relatively continuous as soon as the operator perceptibly reduces the force exerted on the actuating member or completely releases the actuating member.

For manually operated presses with large ram strokes, because of the mechanical properties of such spiral springs, spiral springs with a relatively low spring constant may be used. Even with large expected rotation angles, spiral springs may be designed relatively compactly and be easily accommodated in the slider housing of the manually operated press.

According to a refinement, the shaft is mounted so as to be rotatable in a slider housing in which the press ram is longitudinally guided, wherein the spiral spring is arranged in a spring housing which is mounted in the slider housing.

This refinement is advantageous in particular from safety aspects. The spiral spring is namely arranged in an extra housing, the spring housing, and can be mounted together with the spring housing in the slider housing. The spiral spring may thus be preloaded even before installation in the slider housing. Therefore, the spiral spring, which in preloaded state has a very high potential energy, offers no danger during installation. Together with the spring housing, it may be inserted in the slider housing relatively easily and without danger even in the preloaded state.

Without such an "extra" spring housing, the spiral spring would have to be inserted directly in the slider housing of the press. Since the spiral spring must typically be preloaded in order to guarantee a sufficient return force, in such a case, because of the preloaded spring, there could be a very high risk potential during mounting since the preloaded spiral spring tries to expand with high energy in order to return to its original state (unloaded state). This may however be avoided by accommodating the spiral spring in a spring housing.

By suitably coupling the spiral spring to the shaft or spring housing, the spiral spring according to the above-mentioned refinement may also be inserted in the spring housing while initially unloaded or under only slight preload, and only preloaded after mounting in the slider housing of the press, without this leading to any danger to the operator or installation engineer.

The spring housing may be formed in two pieces and may comprise a pot-like or basket-like housing part and a cover part that is attached to the pot-like or basket-like housing part. For maintenance and repair purposes, the spring housing can be removed from the slider housing relatively easily and then the spiral spring removed from the spring housing by separating the cover part from the housing part.

In the mounted state of the press, the radially inner end of the spiral spring may be coupled to the shaft, and its radially outer end is coupled to the spring housing.

According to a further refinement, the spiral spring comprises a first connecting link at a radially inner end and a second connecting link at a radially outer end. The first connecting link may serve for fixing the spiral spring to the shaft. The second connecting link may serve for fixing the spiral spring to the spring housing. If no extra spring housing is provided, the second connecting link of the spiral spring may also be connected directly to the slider housing.

The connecting links may be configured as tabs. There are several advantages with forming such tabs at the ends of the spiral spring. In contrast to the coupling of such springs according to the presumably closest prior art, by means of screws or carrier latches/webs which engage in bores or keyhole cutouts in the spring, when forming tabs at the ends of the spiral spring, no cutouts need be provided in the spring leaf which would negatively influence the strength and hence the life of the spiral spring. Also, the use of screws or carrier latches/webs would lead to the outer windings of the spiral spring, which are wound onto the shaft, lying locally on the screw head or latch or web, since the screw or latch/web would always have to be made higher than the material thickness of the spring leaf in order to guarantee secure retention. Due to the constant dynamic loading during a stroke movement, premature wear and possibly a crack/breakage of the spiral spring might occur at this contact face (the contact point between the spring leaf and the screw/latch or web). All this may however be avoided by the provision of tabs at the ends of the spiral spring.

According to a refinement, the first and the second tabs are configured as curved portions that are integrally connected to the spiral spring, wherein the first connecting link is curved in the direction of curvature of the spiral spring and wherein the second connecting link is curved opposite to the curvature of the spiral spring.

The two tabs are preferably not fully closed tabs but merely bent, substantially U-shaped ends of the spring leaf which are curved more tightly than the other parts of the spiral spring between the ends of the spring leaf. This creates a type of hook which can easily be attached to the shaft or spring housing or slider housing (if no spring housing is present).

The second tab, curved opposite to the curvature of the spiral spring, is attached to the spring housing or slider housing. This attachment is preferably achieved when the spiral spring is mounted in the spring housing, i.e. before the spring housing together with the spiral spring is inserted in the slider housing of the press.

The first tab, curved in the direction of curvature of the spiral spring, is attached to the shaft after insertion of the spring housing in the slider housing. This attachment process may be relatively simple to implement.

In a refinement, the shaft comprises a web that is oriented parallel to a longitudinal axis of the shaft, wherein a cavity, in which the first connecting link engages, is arranged between the web and an outside of the shaft facing towards the web.

This web allows simple but nonetheless secure connection of the spiral spring to the shaft. The web may for example be configured as a cylindrical or heavy type dowel pin. Because of the simple connection between the first connecting link provided on the spiral spring and the web, it is conceivably simple to mount the preloaded spiral spring in the spring housing in the slider housing. The spring housing, together with the spiral spring, is first inserted in the slider housing. In the next step, the shaft must merely perform a revolution in order to hook the first connecting link in the web arranged on the shaft. Further revolutions of the shaft (for example by actuation of the actuating member) bring the inner exposed windings of the spiral spring to bear on the shaft or on the windings already wound on the shaft. The reset mechanism can therefore be used directly.

It is furthermore advantageous that the installation dimension of the spiral spring, which is predefined by the spring housing, does not change. On actuation of the actuating member or on rotation of the shaft, only the ratio of outer windings to inner windings of the spiral spring changes.

In a further refinement, the shaft comprises a flat face on the outside facing towards the web.

Such a flat face simplifies attachment of the first connecting link to the web. The cavity previously described, which is arranged between the web and outside of the shaft facing towards the web, is created between the web and this flat face.

In a further refinement, a top side of the web facing away from the shaft is flush with an outer circumferential face of the shaft.

This has the advantage that, when wound onto the shaft, the outer windings of the spiral spring are wound relatively evenly over the entire circumference of the shaft without kinks or irregularities. This even application of the spiral spring to the shaft allows the service life of the spiral spring to be extended.

In a further refinement, the actuating member comprises an actuating lever that is coupled to the shaft and runs transversely thereto, wherein a counterweight is arranged on a side of the shaft opposite the actuating lever and is coupled to the actuating lever and/or the shaft, and serves as a torque balance during actuation of the actuating lever, wherein the counterweight has a greater mass than the actuating lever, and a center of gravity of the counterweight has a shorter distance from the shaft than a center of gravity of the actuating lever.

By providing such a counterweight, both the stroke movement or actuation of the actuating lever and the return movement caused by the reset mechanism can be made more even. The use of the counterweight means that the position of the actuating lever has no effect on the reset force of the reset mechanism.

The counterweight is preferably dimensioned such that, during actuation of the actuating lever and during the return movement, the counterweight acts as a preferably complete torque balance for the actuating lever. This torque balance allows the actuating lever to be moved very evenly under a constant force application, irrespective of its momentary (angular) position. This even applies to the case in which an operator of the press releases the actuating lever after the pressing process. Then the return movement of the actuating lever takes place with a constant speed over the entire angular range of the movement.

Without such a counterweight, the influence of the own weight of the actuating lever on the return force of the reset mechanism would have a direct effect on the speed of the press ram. If the actuating lever is namely in the horizontal position and points towards the operator, the force exerted by the own weight of the actuating lever on the shaft would counter the reset force of the reset mechanism. If however the actuating lever is in the horizontal position and points away from the operator, the force exerted by the own weight of the actuating lever on the shaft would amplify the reset force of the reset mechanism. Thus it would lead to a very uneven movement of the actuating lever.

A further advantage of the use of a counterweight for the above-mentioned torque balance is that the reset mechanism can be designed more simply, or a spring used in the reset mechanism (in the present case, the spiral spring) may have smaller dimensions. Without such a counterweight, the spiral spring or the reset mechanism would have to be dimensioned larger. This in turn would require a greater installation space for the reset mechanism, which firstly would require extra adaptations to the press and secondly would lead to undesirably large components. A large reset mechanism, or a stronger spiral spring, would also have a higher potential energy in the tensioned state. If the operator's hand then slipped on the actuating lever, this would cause the actuating lever to be set in rotation very quickly because of the reset mechanism. This in turn could constitute a substantial risk potential for the operator.

All this may be effectively avoided by the provision of the counterweight. In particular when used together with the above-mentioned spiral spring, a movement of the actuating lever can be achieved which is very continuous and almost risk-free for the operator, which is extremely advantageous from an ergonomic aspect.

As already stated, the counterweight has a greater mass than the actuating lever. This allows the counterweight to be designed relatively compactly, so that the counterweight scarcely increases the installation space of the press. The center of gravity of the counterweight however has a shorter distance from the shaft than the center of gravity of the actuating lever.

The actuating lever preferably runs transversely to the shaft. The term "transversely" in the present case does not necessarily mean orthogonally, but any arbitrary orientation which is not parallel. The actuating lever may thus for example also be oriented at an acute angle relative to the shaft or its longitudinal axis. Preferably, the actuating lever is straight or rectilinear. This also need not necessarily be the case. For example, the actuating lever may also be curved or angled.

In a further refinement, the actuating member furthermore comprises a handle lever which is mounted on the actuating lever transversely to the actuating lever, wherein a mass of the counterweight is dimensioned such that during actuation of the actuating lever, the counterweight serves as a torque balance for the actuating lever and the handle lever.

The handle lever is advantageous in particular in manually operated presses with a long ram stroke, in which the actuating lever must perform a rotational movement over a large angular range, for example >360°. In such a case, the ergonomics for the operator may be improved many times by the provision of such a handle lever which is mounted on the operating lever transversely to the operating lever. An awkward "repositioning" of the user's operating hand is no longer necessary when operating the device with the handle lever.

By corresponding dimensioning of the mass or center of gravity of the counterweight, the above-mentioned torque balance may be adapted accordingly for the own weight of the handle lever in addition to the own weight of the actuating lever.

In a further refinement, the handle lever is mounted on the actuating lever so as to be rotatable about its longitudinal axis.

Such a mounting of the handle lever may further improve the ergonomics for the operator. The handle lever is oriented transversely, preferably orthogonally, to the actuating lever. The term "transversely" should also be interpreted generally in the above sense.

In a further refinement, the counterweight comprises a first counterweight and a second counterweight, wherein a mass of the first counterweight is dimensioned such that during actuation of the actuating lever, the first counterweight serves as a torque balance for the actuating lever, and wherein a mass of the second counterweight is dimensioned such that during actuation of the actuating lever, the second counterweight serves as a torque balance for the handle lever.

In this refinement, it is particularly preferred if the first and second counterweights are each coupled releasably to the actuating lever and/or the shaft, and the handle lever is mounted releasably on the actuating lever.

In this way, it is in fact possible to use the actuating lever both with and without the handle lever arranged thereon. If the handle lever is mounted on the actuating lever, both counterweights can be coupled to the actuating lever and/or shaft for torque balance. If however the actuating lever is used without the handle lever, one of the two counterweights (the second counterweight) may be omitted or removed from the actuating lever and/or the shaft. Irrespective of whether one or more counterweights are used, these can be both mounted directly on the actuating lever and, alternatively or additionally, connected to the shaft. This has no influence on the above-described effect of the torque balance.

In a further refinement, the shaft is configured as a spur gear shaft, and the press ram or a component coupled thereto has a toothing in which the spur gear shaft engages.

According to this refinement, the press is configured as a so-called rack press. The spur gear shaft may be formed as one piece (toothed shaft) or in multiple pieces as a shaft with a shaft-hub connection and the spur gear arranged thereon. The ram may be configured both as a round ram or a square ram. The toothing may be arranged directly on the press ram. Alternatively it may also be arranged on a component coupled to the press ram, for example a rack running parallel to the press ram which simultaneously serves as an anti-twist device for the press ram.

In principle, the press may also be configured as a toggle press. In such a case, the shaft is then designed as a regular shaft, i.e. not as a spur gear shaft.

The features described above and to be explained below may not only be used individually but also combined with each other in any combination without leaving the spirit and scope of the present disclosure.

DESCRIPTION OF PREFERRED EMBODIMENTS

Figure 1:
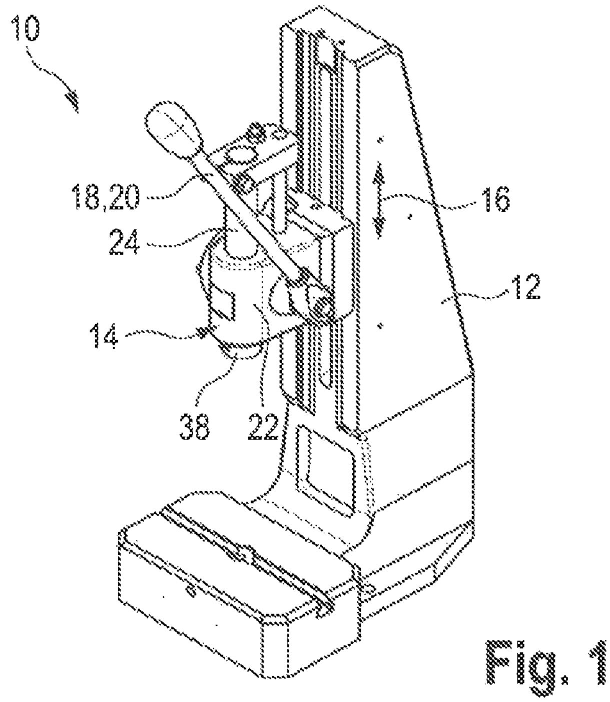
FIG. 1 a first perspective view of a manually operated press according to a first embodiment.
Figure 2:
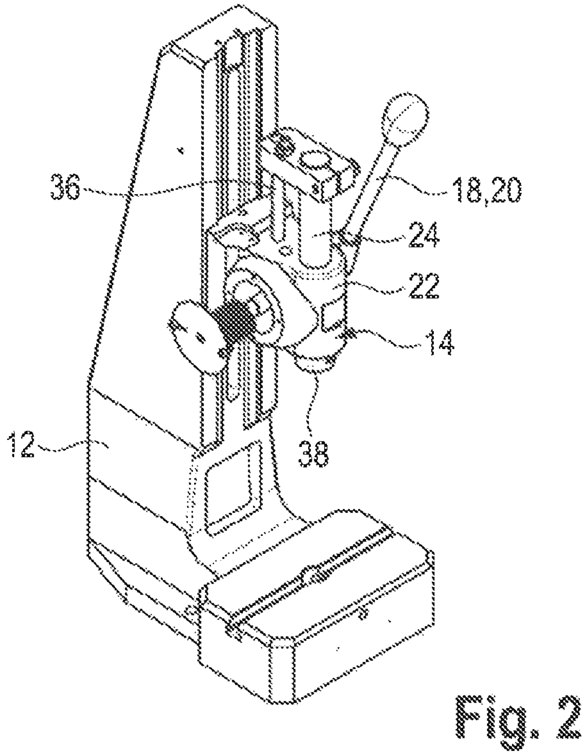
FIG. 2 a second perspective view of the manually operated press according to the first embodiment.

FIGS. 1 to 4 show a first embodiment of a manually operated press. The press as a whole is designated with the reference sign 10.

The press 10 comprises a base part 12 which is typically known as a press frame. The press frame 12 forms the basic structure of the press 10 and substantially serves as a carrier for the other components of the press 10. The press frame 12 is usually placed on a support, for example a workbench.

A so-called slider 14 is mounted on the press frame 12, and in the present embodiment is arranged on the press frame 12 so as to be adjustable in the height direction indicated by the double arrow 16. This adjustability allows the slider 14 to be adjusted in the height direction 16 according to the workpiece size and desired stroke.

At the side of the slider 14, an actuating member 18 is arranged which, in the present embodiment, is configured as a linear actuating lever 20. This actuating member 18 serves for manual actuation of the press 10. Instead of an actuating lever 20, in principle a wheel or other type of handle may be used to actuate the press 10 by hand.

Figure 8:
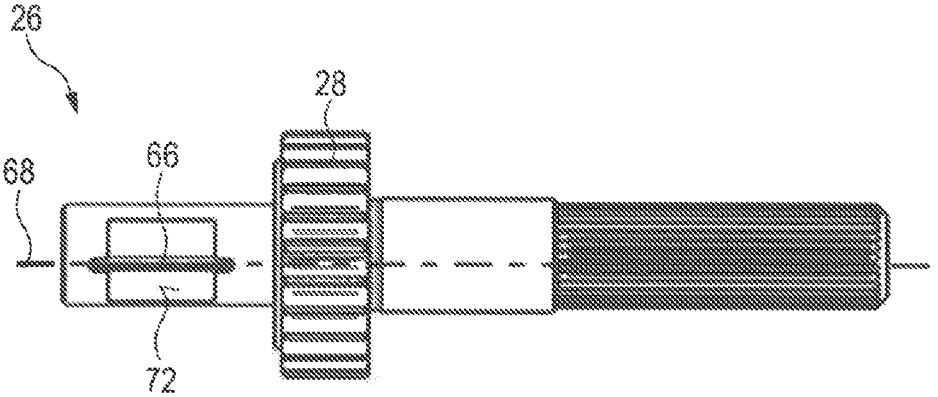
FIG. 8 a top view of an embodiment of a shaft used in the press.
Figure 9:
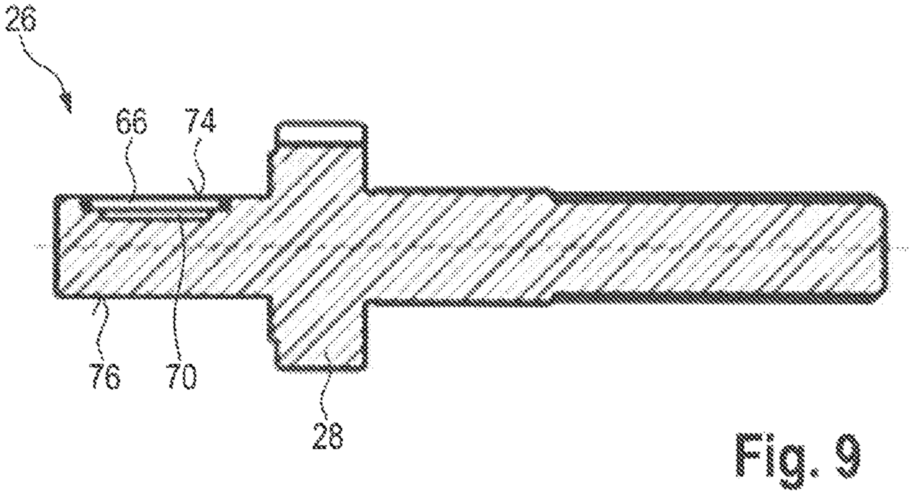
FIG. 9 a sectional view of the shaft shown in FIG. 8.

In the present embodiment, the press 10 is configured as a rack press. A press ram 24 is guided longitudinally in the housing of the slider 14, known as the slider housing 22. A shaft 26, shown in detail in FIGS. 8 and 9, is arranged transversely, preferably orthogonally thereto in the slider housing 22.

The shaft 26 is mounted rotatably in the slider housing 22. In the present embodiment, the shaft is configured as a spur gear shaft (see FIGS. 8 and 9). The spur gear shaft 26 may either be formed as one piece, wherein the spur gear 28 is integrally connected to the shaft 26, or may be formed from multiple pieces, wherein the spur gear 28 is inserted in a corresponding shaft-hub connection on the shaft 26.

The shaft 26 is coupled to the press ram 24. More precisely, the spur gear 28 engages in a toothing 30 provided on the rear side of the press ram 24 (see FIG. 3).

The actuating member 18 or actuating lever 20 is coupled to the press ram 24 via the shaft 26 that is mounted rotatably in the slider housing 22. An actuation of the actuating lever 20 in the direction of the arrow 32 (shown schematically in FIG. 3) leads to a stroke movement of the press ram 24, in which the press ram 24 is moved downward in the direction of the arrow 34 (see FIG. 3). A shaft 36 running parallel to the press ram 24, and also guided longitudinally in the slider housing 22, prevents a twist of the press ram 24 during this stroke movement. The shaft 36 is therefore described as an anti-twist device.

When the press 10 is configured as a rack press, the toothing 30 need not necessarily be arranged on the press ram 24 itself. In principle, it could also be arranged on the shaft or anti-twist device 36.

At the lower end of the press ram 24, a tool receiver 38 is provided for receiving customer-specific pressing tools. Different pressing tools can be attached to this tool receiver 38 relatively easily using a fixing means, for example by means of a screw. The ram stroke is determined by the length of the toothing 30 arranged on the press 24 and the adjustment angle of the actuating lever 20.

For easier operation, the press 10 furthermore comprises a reset mechanism 40, which is shown at least in part in FIGS. 4 to 7. This reset mechanism serves for resetting the press ram 24 and hence also the actuating lever 20. The reset mechanism 40 causes a return movement of the press ram 24 or actuating lever 20 which is opposite to the stroke movement of the press ram 24 or actuating movement of the actuating lever 20. This return movement moves the press ram 24 upward in the direction of the arrow 42 (indicated schematically in FIG. 3) and moves the actuating lever 20 back to its starting position in the direction of the arrow 44

Figure 3:
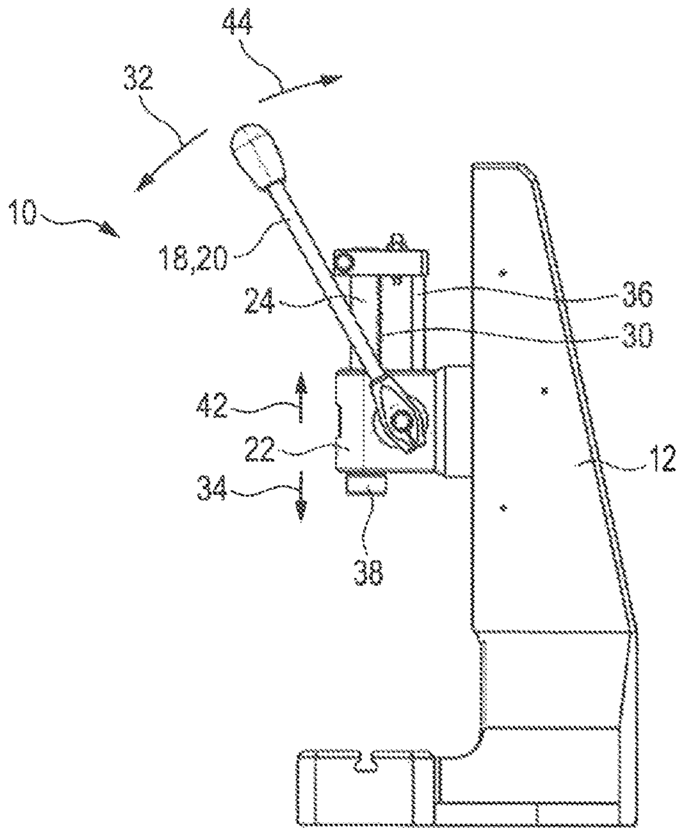
FIG. 3 a side view of the manually operated press according to the first embodiment.

(indicated schematically in FIG. 3). This starting position, in which the press ram 24 is at its upper stop, is shown in FIG. 3.

Figure 5:
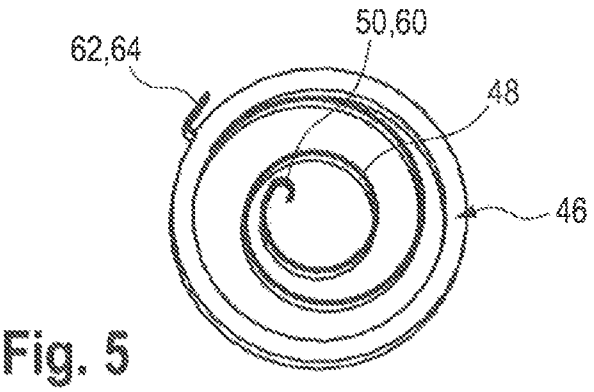
FIG. 5 a top view of a spiral spring according to an embodiment.

The force of the reset mechanism 40 is produced by a spiral spring 46, which is shown in detail in FIG. 5. The spiral spring 46 comprises a strip-like spring leaf 48 or spring plate wound in a spiral pattern. In contrast to a helical spring or torsion spring, such a spiral spring 46 is under tension when loaded. Loading tightens or winds the spirally wound spring leaf 48. This shortens the distance between the radially outer windings and the radially inner windings of the spring leaf 48. Such a spiral spring 46 is also known as a motive spring.

The spiral spring 46 is arranged on the shaft 26 or around the shaft 26. The radially inner end 50 of the spring leaf 48 is preferably connected directly to the shaft 26. On rotation of the shaft 26 during the stroke movement, which corresponds to a counterclockwise rotation of the shaft 26 in FIGS. 3 and 5, the spring leaf 48 tightens as stated above and winds onto the shaft 26.

An inner housing wall may be provided at the radially inner end of the spiral spring 46, in order to prevent a direct contact of the radially inner windings of the spring leaf 48 with the shaft 26. This is however only an optional possibility and not the case in the embodiment shown in FIG. 5.

An essential advantage of the use of such a spiral spring 46 is that the reset force, even with several revolutions of the shaft 26, only increases slightly in comparison with the helical spring or torsion spring. As a result, for the operator there is only a minimal force difference between the starting position and the maximum position of the actuating lever 20. The return movement takes place very similarly.

A further advantage of such a spiral spring 46 is that, in contrast to a helical spring or torsion spring, this does not expand under load, so it can be accommodated very compactly in the slider housing 22.

In comparison with a helical spring or torsion spring, the spiral spring 46 furthermore guarantees the possibility of generating a relatively large reset force despite comparatively fewer windings.

The spiral spring 46 is preferably arranged in an extra housing 52, known as the spring housing. Accommodating the spiral spring 46 in such a spring housing 52 offers the advantage that the spiral spring 46 can be preloaded in advance, i.e. before its installation in the slider housing 22, and then inserted together with the spring housing 52 in the slider housing 22. This is advantageous in particular from safety aspects since there is no risk to the installation engineer from the spiral spring 46. Also, installation of the spiral spring 46 is thereby considerably simplified.

Figure 6:
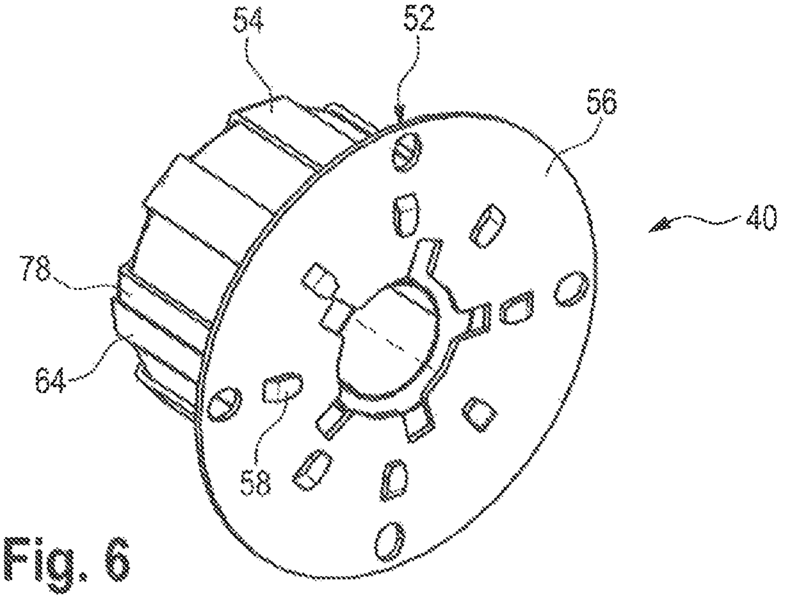
FIG. 6 a perspective view of a spring housing according to an embodiment.
Figure 7:
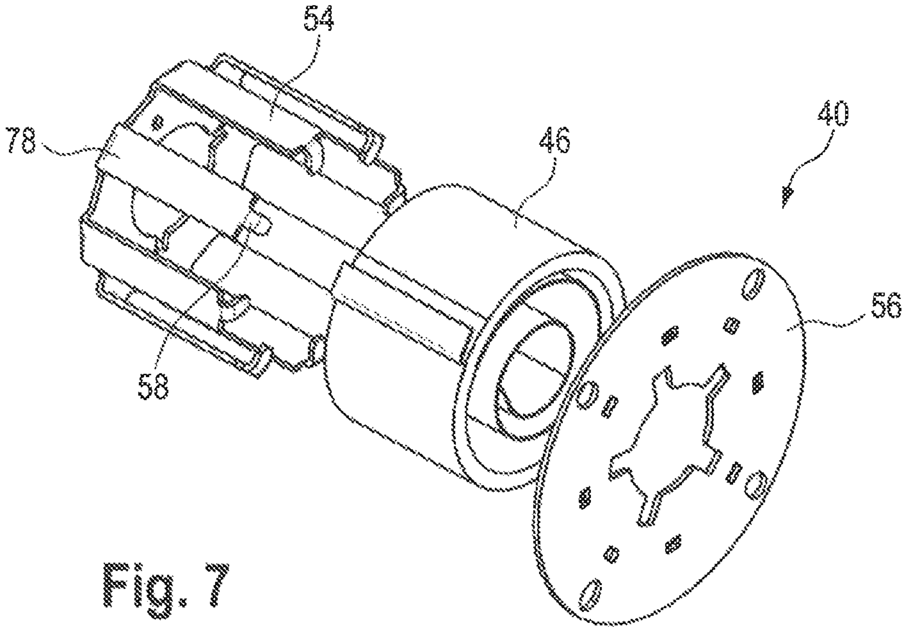
FIG. 7 the spring housing shown in FIG. 6 together with the spiral spring shown in FIG. 5, in an exploded illustration.

The spring housing 52 shown in FIGS. 6 and 7 has a two-part structure. The spring housing 52 comprises a pot-like or basket-like housing part 54 and a cover part 56 which can be connected, preferably releasably, to the housing part 54. In the embodiment shown here, the mechanical connection of the pot-like or basket-like housing part 54 and cover part 56 takes place by caulking of several metal tabs 58. In principle however, various other types of connection of the two parts 54, 56 of the spring housing 52 are conceivable, e.g. with screws, a bayonet closure etc.

In order to minimize friction in the dynamic state, the spiral spring 46 is preferably coated with a lubricant before installation in the spring housing 52.

At its radially inner end, the spiral spring 46 comprises a first connecting link 60 for attaching to the shaft 26. At its radially outer end 62, the spiral spring 46 comprises a second connecting link 64 for attaching to the spring housing 52. The two tabs 60, 64 are preferably integrally connected to the spring leaf 48 of the spiral spring 46. Particularly preferably, the two tabs are configured as curved portions which are created by bending the ends 50, 62. Both tabs 60, 64 are curved preferably more strongly than the spring leaf 48 or other parts of the spring leaf 48 of the spiral spring 46. The first connecting link 60 is curved in the direction of curvature of the spiral spring 46. The second connecting link 64 is curved opposite to the curvature of the spiral spring 46.

By means of said tabs 60, 64, the spiral spring 46 can be attached relatively easily by fixing to the shaft 26 or spring housing 52. As a counterpiece to the first connecting link 60, a web 66 is provided on the shaft 26 (see FIGS. 8 and 9). This web 66 runs parallel to the longitudinal axis 68 of the shaft 26. Below the web 66 is a cavity 70 in which the first connecting link 60 of the spiral spring 46 engages. The cavity 70 lies at an outside of the shaft which faces towards the web 66 and is set back relative to the outer periphery of the shaft 26. On this outside, the shaft 26 preferably comprises a flat face 72. This flat face 72 or the cavity formed between the flat face 72 and the web 66 simplifies insertion of the first connecting link 60 of the spiral spring 46.

As evident from FIG. 9, the top side 74 of the web 66 facing away from the shaft 26 is arranged flushed with an outer circumferential face 76 of the shaft 26. This has the advantage that when the spiral spring 46 is wound up, no folds are formed within the spring leaf 48 since the spring leaf 48 can "wrap" itself evenly around the circumference of the shaft 26. This effectively avoids premature breakage of the spiral spring 46, so the service life of the spiral spring may be extended multiple times.

The second connecting link 64 arranged at the radially outer end 62 of the spiral spring 46 is attached to a web 78 of the spring housing 52 (see FIG. 6). This type of connection between the spiral spring 46 and the shaft 26 or spring housing 52 by means of tabs 60, 64 has the particular advantage that, firstly, mounting is relatively simple, and secondly, the spiral spring or spring leaf 48 is not weakened by the tabs 60, 64.

It is understood that the advantages resulting from the tabs 60, 64 would also be achieved if the spiral spring 46 were attached directly to the slider housing 22 (without the spring housing 52). Such an arrangement would also be conceivable using a corresponding web on the slider housing 52 (similar to the web 78 on the spring housing 52).

Figure 4:
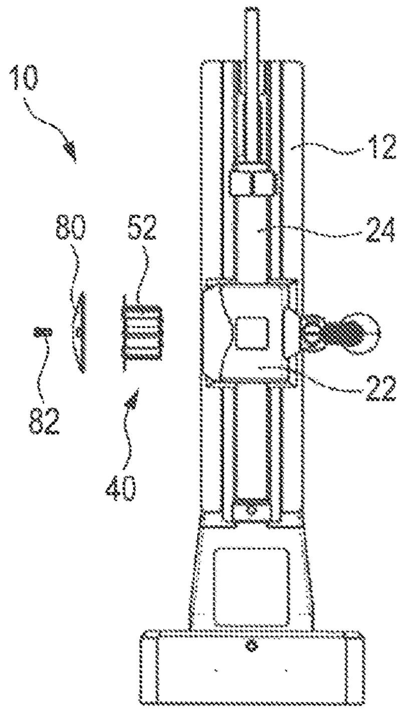
FIG. 4 a front view of the manually operated press according to the first embodiment, wherein parts of the manually operated press are depicted in an exploded illustration.

In the present embodiment, after installation in the spring housing 52 and in the already preloaded state, the spiral spring 46 is inserted in a recess provided in the slider housing 22 and then mounted by means of the cover 80, which is attached to the slider housing 22 for example by means of two screws 82 (see FIG. 4).

In the next step, the shaft 26 need merely perform a revolution in order to attach the first connecting link 60 of the spiral spring 46 on the web 66 or in the cavity 70. This takes place more or less automatically by rotation of the shaft 26. Further movement of the actuating lever 20 in the actuation direction 32 causes the inner exposed windings of the spiral spring 46 to bear on the shaft 26 or on the windings already wound onto the shaft 26.

The advantage here is that the installation dimension of the spiral spring 46, which is predefined by the spring housing 52, does not change. Only the ratio of outer windings to inner windings of the spring leaf 48 changes. As soon as the spiral spring 46 is mounted in the slider housing 22 and connected to the shaft 26 in the manner described above, the starting position of the press ram 24 and actuating lever 20 can then be adjusted relative to one another, in order to set the desired starting position of the actuating lever 20. For this, the actuating lever 20 is attached, preferably releasably, to the shaft 26 so that it can be adjusted accordingly in the direction of the arrow 32 or in the direction of the arrow 44 during setup of the press 10, and then re-attached to the shaft 26.

Figure 10:
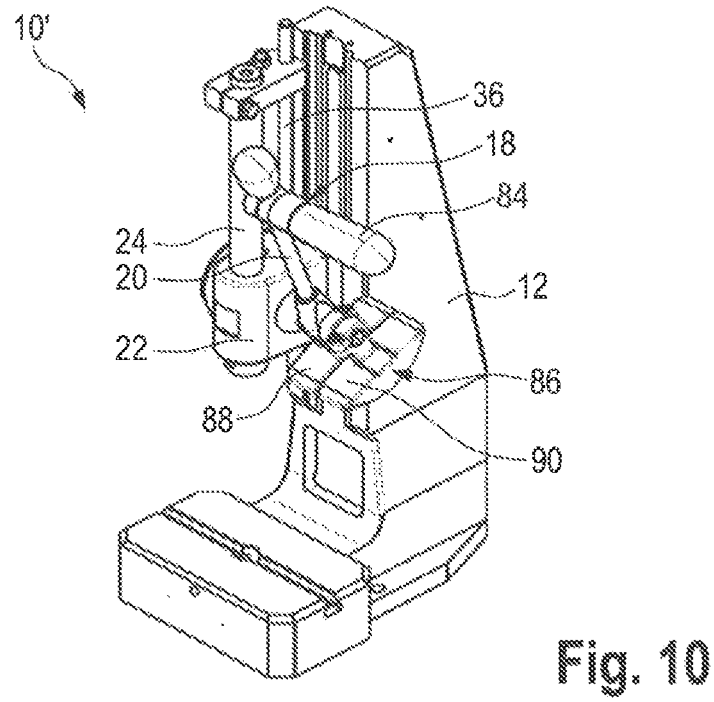
FIG. 10 a perspective view of a second embodiment of the press.
Figure 11:
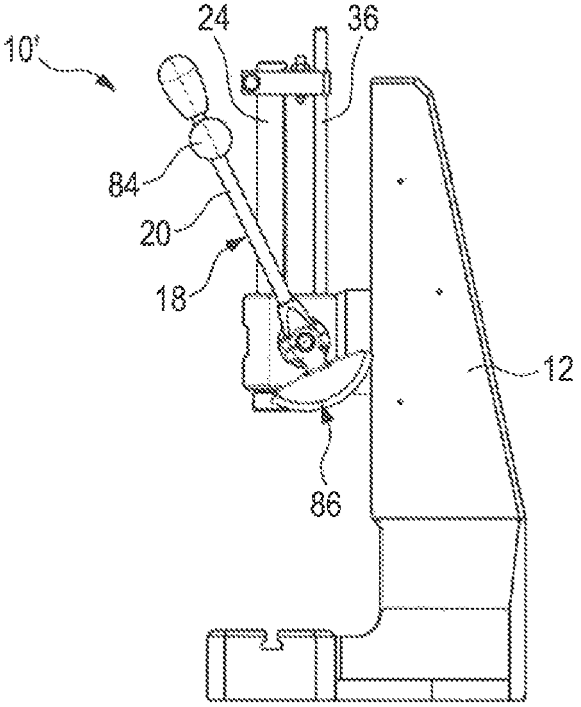
FIG. 11 a side view of the press shown in FIG. 10 according to the second embodiment.

FIGS. 10 and 11 show a second embodiment of the press. The press as a whole is designated with the reference sign 10'. For all other components which correspond to the components of the press 10 according to the first embodiment, the same reference signs as before are used. Also, only the differences between the second embodiment, shown in FIGS. 10 and 11, and the first embodiment, shown in FIGS. 1 to 4, are explained below. The other statements relating to the spiral spring 46, spring housing 52 and shaft 26 also apply accordingly to the second embodiment.

As well as a comparatively larger ram stroke, the press 10' according to the second embodiment substantially differs in the design of the actuating member 18.

The actuating member 18 comprises an actuating lever 20 and a handle lever 84, which is mounted on the actuating lever 20 transversely to the actuating lever 20. Such a handle lever 84 is frequently described as an ergo handle. The handle lever 84 is advantageous in particular in pressing processes with a long ram stroke, since here the actuating lever 20 must perform a rotational movement of >360°. On such a large rotational movement, the handle lever 84 prevents an awkward repositioning on the actuating lever 20 which is disadvantageous both ergonomically and for safety reasons, since the user's hand can relatively easily slip off the actuating lever 20 during such a repositioning.

In order to further improve the ergonomics, the handle lever 84 may be mounted on the actuating lever 20 so as to be rotatable about its longitudinal axis. In this way, the user may very easily exert force on the handle lever 84 or actuating lever 20 without needing to change the orientation of his hand during actuation.

Nonetheless, the handle lever 84 is an optional feature since, in principle, the press may be operated without the handle lever 84, purely by means of the actuating lever 20. The handle lever 84 is therefore preferably mounted releasably on the actuating lever 20 so that the handle lever 84 may be used or omitted as desired.

Furthermore, a counterweight 86 is mounted on the actuating member 18. This counterweight 86 serves to compensate for the own weight of the actuating lever 20 and the handle lever 84 where used. The counterweight 86 provides a torque balance which allows the actuating member 18 to be moved continuously, irrespective of its angular position. This allows a more pleasant operation for a user of the press, without the force or moment conditions changing during actuation of the actuating member 18. Also, because of the counterweight 86, the return movement of the actuating member 18 is continuous.

Because of the provision of the counterweight 86, the reset mechanism 40 may also be made smaller. This in turn results in a less powerful acceleration of the actuating member 18 by the reset mechanism 40 during the return movement. A risk potential for the user of the press may thereby be substantially minimized.

Because of its very compact arrangement, the counterweight 86 also scarcely constitutes any hindrance to the user. Preferably, it has a larger mass than the actuating lever 20. If the actuating lever 20 is used together with the handle lever 84, the mass of the counterweight 86 is dimensioned larger than the sum of the masses of the actuating lever 20 and handle lever 84. For this reason, the counterweight 86 may be designed relatively small. The center of gravity of the counterweight 86 has a shorter distance from the shaft 26 than the center of gravity of the actuating lever 20 or handle lever 84.

The counterweight 86 may be mounted on the shaft 26 and/or the actuating lever 20.

In the embodiment shown here, the counterweight 86 has a first counterweight 88 and a second counterweight 90. The first counterweight 88 serves as a weight or torque balance for the actuating lever 20. The second counterweight 90 serves as a weight or torque balance for the handle lever 84.

The two counterweights 88, 90 are preferably coupled releasably to the actuating lever 20 and/or the shaft 26. If the press is operated solely with the actuating lever 20, only the first counterweight 88 is used and the second counterweight 90 is removed from the press. If however the actuating lever 20 is used together with the handle lever 84, both counterweights 88, 90 are used. Thus a linear reset force of the reset mechanism 40 may be produced, irrespective of whether the actuating lever 20 is used with or without the handle lever 84.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A manually operated press, comprising:
a shaft;
an actuating member coupled to the shaft;
a press ram coupled to the shaft; and
a reset mechanism that is configured to reset the actuating member;
wherein an actuation of the actuating member is converted into a stroke movement of the press ram;
wherein the reset mechanism is configured to counteract the actuation of the actuating member and to cause a return movement of the press ram opposite the stroke movement,
wherein the reset mechanism comprises a spiral spring,
wherein a radially inner end of the spiral spring is attached to the shaft,
wherein the spiral spring comprises a first connecting link at the radially inner end,
wherein the first connecting link comprises a curved portion that is integrally connected to the spiral spring, and wherein the shaft comprises a web that is oriented parallel to a longitudinal axis of the shaft, wherein a cavity is arranged between the web and an outer side of the shaft facing towards the web, and wherein the first connecting link engages in the cavity.

2. The manually operated press as claimed in claim 1, wherein the spiral spring comprises a spirally wound leaf spring.

3. The manually operated press as claimed in claim 1, further comprising:

a slider housing; and a spring housing mounted in the slider housing;

wherein the shaft is arranged to be rotatable in the slider housing, and the press ram is longitudinally guided in the slider housing, and wherein the spiral spring is arranged in the spring housing.

4. The manually operated press as claimed in claim 3, wherein the spring housing comprises a pot-like or basket-like housing part and a cover part attached to the housing part.

5. The manually operated press as claimed in claim 3, wherein a radially outer end of the spiral spring is attached to the spring housing.

6. The manually operated press as claimed in claim 5, wherein the spiral spring further comprises a second connecting link at the radially outer end.

7. The manually operated press as claimed in claim 6, wherein each of the first connecting link and the second connecting link comprises a curved portion that is integrally connected to the spiral spring, wherein the curved portion of the first connecting link is curved in a direction of curvature of the spiral spring, and wherein the curved portion of the second connecting link is curved opposite to the direction of curvature of the spiral spring.

8. The manually operated press as claimed in claim 1, wherein the shaft comprises a flat face on the outer side facing towards the web.

9. The manually operated press as claimed in claim 8, wherein a top side of the web facing away from the shaft is flush with an outer circumferential face of the shaft.

10. The manually operated press as claimed in claim 1, wherein the actuating member comprises an actuating lever that is coupled to the shaft and runs transversely to the shaft, wherein a counterweight is arranged on a side of the shaft opposite the actuating lever and is coupled to at least one of the actuating lever and the shaft, and serves as a torque balance during actuation of the actuating lever, wherein the counterweight has a greater mass than the actuating lever, and a center of gravity of the counterweight has a shorter distance from the shaft than a center of gravity of the actuating lever.

11. The manually operated press as claimed in claim 10, wherein the actuating member furthermore comprises a handle lever that is mounted on the actuating lever transversely to the actuating lever, and wherein a mass of the counterweight is dimensioned such that during actuation of the actuating lever, the counterweight serves as a torque balance for the actuating lever and the handle lever.

12. The manually operated press as claimed in claim 11, wherein the handle lever is mounted on the actuating lever so as to be rotatable about a longitudinal axis of the handle lever.

13. The manually operated press as claimed in claim 11, wherein the counterweight comprises a first counterweight and a second counterweight, wherein a mass of the first counterweight is dimensioned such that during actuation of the actuating lever, the first counterweight serves as a torque balance for the actuating lever, and wherein a mass of the second counterweight is dimensioned such that during actuation of the actuating lever, the second counterweight serves as a torque balance for the handle lever.

14. The manually operated press as claimed in claim 13, wherein the first and second counterweights are each releasably coupled to at least one of the actuating lever and the shaft, and wherein the handle lever is mounted releasably on the actuating lever.

15. The manually operated press as claimed in claim 1, wherein the shaft comprises a spur gear shaft, and the press ram or a component coupled to the press ram comprises a toothing in which the spur gear shaft engages.

16. The manually operated press as claimed in claim 1, wherein the cavity is set back relative to an outer periphery of the shaft.

17. The manually operated press as claimed in claim 1, wherein the first connecting link is hook-shaped or substantially U-shaped.

* * * * *